United States Patent
Gentle et al.

(10) Patent No.: US 11,610,440 B2
(45) Date of Patent: Mar. 21, 2023

(54) REMAINING USEFUL LIFE PREDICTION FOR A COMPONENT OF A MACHINE

(71) Applicant: Caterpillar Inc., Peoria, IL (US)

(72) Inventors: Michael C. Gentle, Maroa, IL (US); Nathaniel Harshman, Sullivan, IL (US)

(73) Assignee: Caterpillar Inc., Peoria, IL (US)

( * ) Notice: Subject to any disclaimer, the term of this patent is extended or adjusted under 35 U.S.C. 154(b) by 766 days.

(21) Appl. No.: 16/553,027

(22) Filed: Aug. 27, 2019

(65) Prior Publication Data
US 2021/0065479 A1 Mar. 4, 2021

(51) Int. Cl.
*G07C 5/08* (2006.01)
*G06N 5/04* (2006.01)

(52) U.S. Cl.
CPC ............. *G07C 5/0816* (2013.01); *G06N 5/04* (2013.01); *G07C 5/085* (2013.01)

(58) Field of Classification Search
None
See application file for complete search history.

(56) References Cited

U.S. PATENT DOCUMENTS

| | | | |
|---|---|---|---|
| 7,178,606 B2 | 2/2007 | Pecchio | |
| 9,243,381 B2 | 1/2016 | Behmlander et al. | |
| 9,809,950 B2 | 11/2017 | Zimmerman et al. | |
| 2011/0247846 A1* | 10/2011 | Greuel | E02F 3/844 |
| | | | 172/781 |
| 2015/0233418 A1 | 8/2015 | Brehm et al. | |
| 2016/0098637 A1* | 4/2016 | Hodel | G05B 23/0221 |
| | | | 706/12 |
| 2018/0106013 A1 | 4/2018 | Cox et al. | |
| 2019/0085528 A1 | 3/2019 | Ono | |
| 2019/0177954 A1* | 6/2019 | Congdon | E02F 3/8152 |
| 2020/0362542 A1* | 11/2020 | Veasy | E02F 3/764 |
| 2021/0180569 A1* | 6/2021 | Schaefer | G01M 5/0033 |

FOREIGN PATENT DOCUMENTS

CA      2353280 A1    2/2002

* cited by examiner

*Primary Examiner* — James J Lee
*Assistant Examiner* — David Hatch
(74) *Attorney, Agent, or Firm* — Harrity & Harrity, LLP

(57) ABSTRACT

A method is disclosed, which may include determining a distance of movement of a component of a machine; determining a load factor on the component over the distance of movement; estimating a remaining useful life of at least one of the component, or a wear component associated with the component, based on the distance of movement and the load factor; and performing one or more actions based on the estimated remaining useful life.

20 Claims, 3 Drawing Sheets

REMAINING USEFUL LIFE PREDICTION FOR A COMPONENT OF A MACHINE

TECHNICAL FIELD

The present disclosure relates generally to machines and, for example, to remaining useful life prediction for a component of a machine.

BACKGROUND

Earthmoving machines, such as motor graders, may be used to perform displacement, distribution, and leveling of material, such as soil. A motor grader typically includes a drawbar-circle-moldboard (DCM) assembly that is mounted to a frame of the motor grader. A circle of the DCM assembly may be configured for rotational movement, and a moldboard of the DCM assembly may be configured for sideshift movement. Furthermore, wear components may be provided between components of the DCM assembly. In particular, the wear components may act as a sacrificial material such that the wear components are worn rather than the components of the DCM assembly during rotational movement of the circle and/or sideshift movement of the moldboard. Once worn, the wear components may be replaced, thereby extending a work life of the DCM assembly.

Wear components may require frequent inspection, adjustment, and/or replacement in order to maintain grade accuracy of the motor grader. However, operators may not be equipped with the tools or time required to perform a full inspection procedure on wear components in order to determine whether the wear components have any remaining useful life. For example, the wear components may be located on areas of the DCM assembly that are difficult to access. As a result, difficulties arise in gauging an extent of wear of the wear components, as well as in determining when to replace the wear components.

One attempt at a wear strip for a moldboard assembly is disclosed in U.S. Patent Application Publication No. 20180106013 ("the '013 publication"). In particular, the '013 publication discloses a wear strip that may include a high-visibility material that is transferred onto a blade of the moldboard assembly at a predetermined percentage of a useful life of the wear strip.

The remaining useful life prediction system of the present disclosure solves one or more of the problems set forth above and/or other problems in the art.

SUMMARY

According to some implementations, a system may include a DCM; a wear component associated with a component of the DCM, the wear component configured to protect the component from wear during movement of the component; and a controller configured to determine a distance of movement of the component of the DCM, determine a load factor on the DCM over the distance of movement, estimate a remaining useful life of the wear component based on the distance of movement and the load factor, and perform one or more actions based on the estimated remaining useful life.

According to some implementations, a motor grader may include a DCM; a wear component associated with a component of the DCM, the wear component configured to protect the component from wear during movement of the component; one or more sensors configured to detect a distance of movement of the component of the DCM, and a load factor on the DCM over the distance of movement; and a controller configured to estimate a remaining useful life of the wear component based on the distance of movement and the load factor.

According to some implementations, a method may include determining, by a device, a distance of movement of a component of a machine; determining, by the device, a load factor on the component over the distance of movement; estimating, by the device, a remaining useful life of at least one of the component, or a wear component associated with the component, based on the distance of movement and the load factor; and performing, by the device, one or more actions based on the estimated remaining useful life.

DETAILED DESCRIPTION

Figure 1:
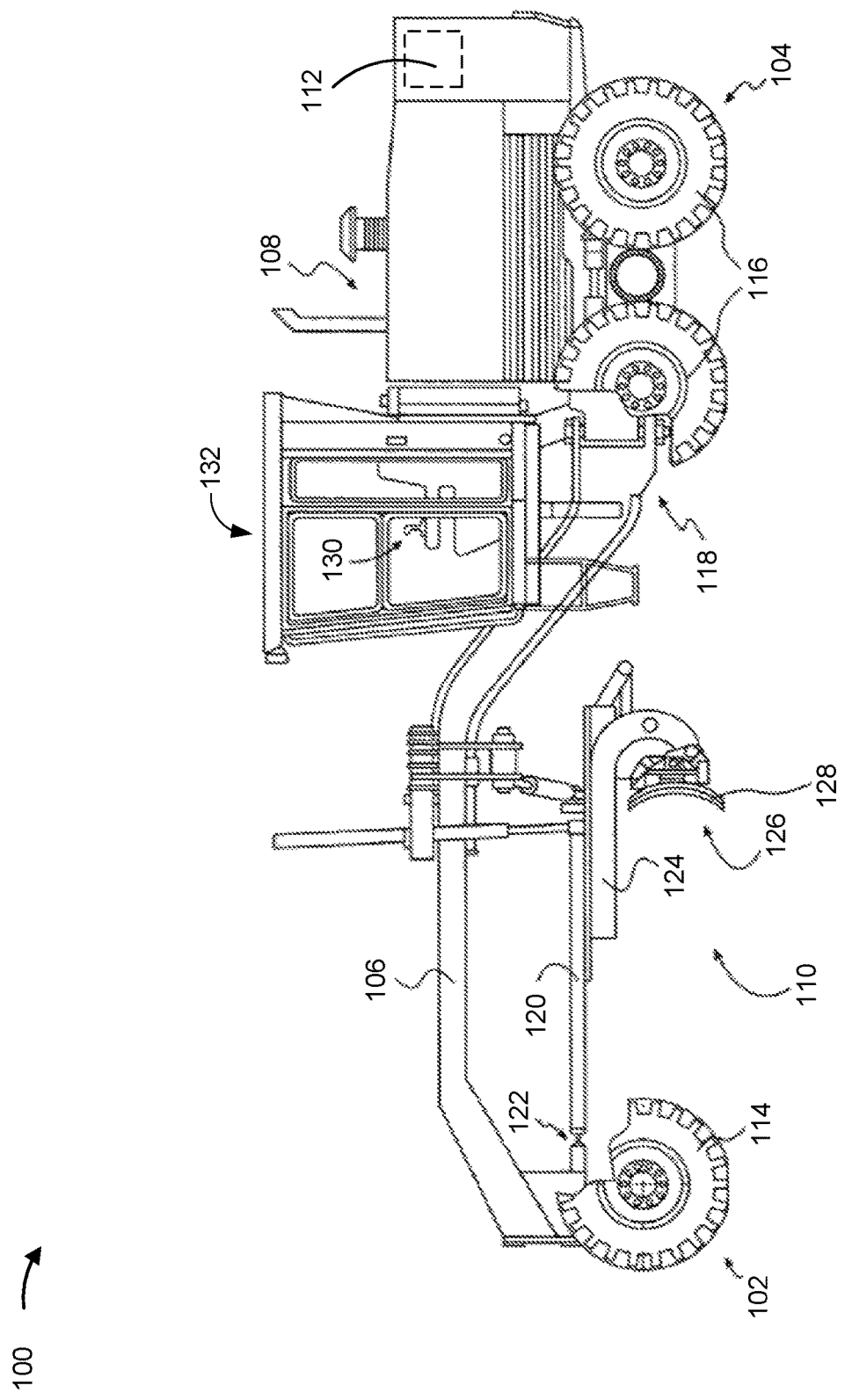
FIG. 1 is diagram of an example machine described herein.

This disclosure relates to prediction of a remaining useful life for a component (e.g., a wear component) of a machine. FIG. 1 is a diagram of an example machine 100 having one or more components for which prediction of a remaining useful life may be performed. As shown in FIG. 1, the machine 100 may embody a motor grader. However, in other embodiments, the machine 100 may embody a loader, a plow, a dozer, an excavator, and/or the like.

Figure 2:
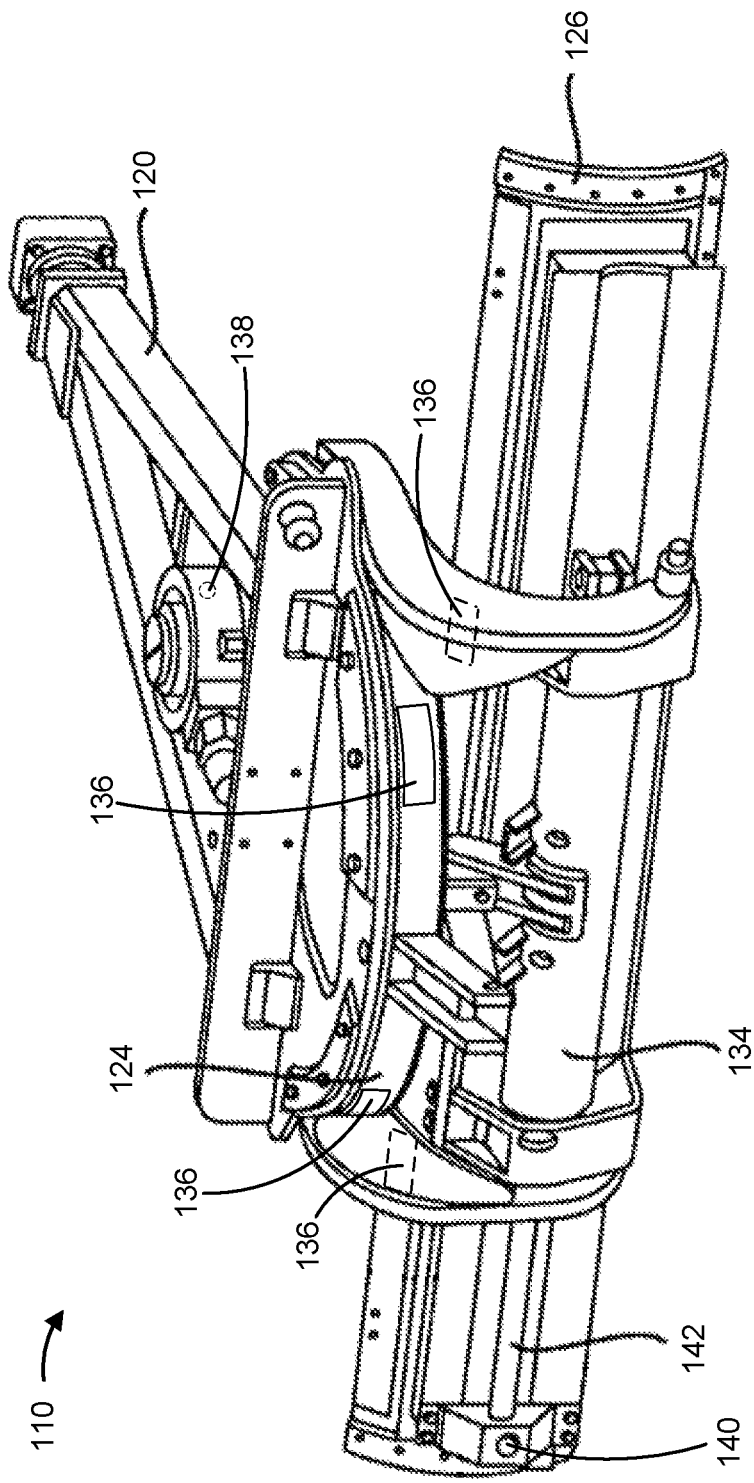
FIG. 2 is diagram of an example DCM assembly that may be used with the machine of FIG. 1.

The machine 100 may include a steerable traction device 102, a driven traction device 104, a frame 106 connecting the steerable traction device 102 to the driven traction device 104, a power source 108 supported by the driven traction device 104, and a transmission (not shown) configured to transmit power from the power source 108 to the driven traction device 104. The machine 100 may also include a work implement, such as a DCM assembly 110, and a controller 112 (e.g., an engine control module). The controller 112 may include one or more memories and one or more processors that implement a remaining useful life prediction system. For example, the controller 112 may be configured to determine a distance of movement of a component of the DCM assembly 110, determine a load factor on the DCM assembly 110 over the distance of movement, estimate a remaining useful life of a wear component (as shown in FIG. 2) based on the distance of movement and the load factor, and perform one or more actions based on the estimated remaining useful life, as described below.

The steerable traction device 102 may include one or more wheels 114 located on each side of the machine 100, and the driven traction device 104 may include one or more wheels 116 located on each side of the machine 100 (only one side shown). Additionally, or alternatively, steerable traction device 102 and/or driven traction device 104 may include tracks, belts, or other traction devices. Frame 106 may connect steerable traction device 102 to driven traction device 104. Frame 106 may include an articulated joint 118 that connects driven traction device 104 to frame 106. Power source 108 may be an engine such as, for example, a diesel engine, a gasoline engine, a natural gas engine, or any other engine. Power source 108 may also be another source of power such as a fuel cell, a power storage device, an electric motor, and/or the like.

The DCM assembly 110 may include a drawbar 120 supported by a center portion of the frame 106 via a hydraulic ram assembly and connected to a front portion of the frame 106 via a ball and socket joint 122. A circle 124 may be connected to the drawbar 120 via additional hydraulic rams and may be configured to support a moldboard 126 having a blade 128. The DCM assembly 110 may be both vertically and horizontally positioned relative to the frame 106. For example, the controller 112 may cause the DCM assembly 110 to vertically pivot the drawbar 120 relative to the frame 106. As another example, the controller 112 may cause the DCM assembly 110 to rotate the circle 124 relative to the drawbar 120 (e.g., around an axis of rotation). As a further example, the controller 112 may cause the DCM assembly 110 to sideshift the moldboard 126 relative to the circle 124. An operator of the machine 100 may control a position of the DCM assembly 110 using an operator control 130 located in operator cab 132.

In addition, the machine 100 may include one or more sensors (not shown). For example, the machine 100 may include one or more sensors associated with the power source 108, which may be configured to obtain measurements relating to a load, a torque, a speed (e.g., revolutions per minute), and/or the like, of the power source 108. As another example, the machine 100 may include one or more sensors associated with the wheels 114 and/or the wheels 116, which may be configured to obtain measurements relating to a speed (e.g., rotational speed) of the wheels 114 and/or the wheels 116.

The machine 100 also may include one more sensors (not shown) associated with the DCM assembly 110. For example, the one or more sensors associated with the DCM assembly 110 may be configured to detect a distance of a vertical pivot of the drawbar 120. The one or more sensors associated with the DCM assembly 110 may also include additional sensors, as described below in connection with FIG. 2.

FIG. 2 shows an example DCM assembly 110 that may be used with the machine 100. As shown in FIG. 2, the drawbar 120 may be connected with the circle 124. A first end of a sideshift mount 134 may be attached to the circle 124, and a second end of the sideshift mount 134 may be engaged with the moldboard 126. One or more wear components 136 may be provided on the DCM assembly 110 at areas of the DCM assembly 110 that are susceptible to wear. The one or more wear components 136 may be strips of a softer material (e.g., plastic) that are located between components of the DCM assembly 110 having a harder material (e.g., steel). For example, one or more wear components 136 may be in sliding contact between components of the DCM assembly 110 that would otherwise contact during a rotational movement of the circle 124 and/or a sideshift movement of the moldboard 126. As an example, one or more wear components 136 may be associated with the circle 124 and/or the moldboard 126. Accordingly, the one or more wear components 136 provide sacrificial material that protects components of the DCM assembly 110 (e.g., the circle 124 and/or the moldboard 126) from wear during movements of the DCM assembly 110.

The DCM assembly 110 also may include one or more sensors. For example, the DCM assembly 110 may include one or more sensors configured to obtain measurements relating to a movement of the circle 124 and/or the moldboard 126. As shown in FIG. 2, the DCM assembly 110 may include one or more sensors 138 associated with an actuator that provides rotational movement to the circle 124. In such a case, the one or more sensors 138 may collect data relating to a distance of movement of the circle 124. For example, the one or more sensors 138 may collect data relating to an angular distance of movement of the circle 124. The angular distance of movement may be converted (e.g., using the controller 112) to a linear distance of movement based on a radius of the circle 124. In some implementations, the actuator of the circle 124 may be a position-sensing cylinder that includes one or more sensors configured to collect data relating to a linear distance of movement of the position-sensing cylinder.

The DCM assembly 110 also may include one or more sensors 140 associated with an actuator that provides sideshift movement to the moldboard 126. For example, as shown in FIG. 2, the actuator may be a position-sensing cylinder 142 that includes the one or more sensors 140, which may be configured to collect data relating to a linear distance of movement of the position-sensing cylinder 142.

In some implementations, the DCM assembly 110 may include one or more sensors, which are not associated with an actuator, configured to obtain measurements relating to a movement of the circle 124 and/or the moldboard 126. For example, such a sensor may include a first sensor member (e.g., which may include a magnet) located on the drawbar 120 and a second sensor member (e.g., which may include a magnet) located on the circle 124 such that movement of the circle 124 causes a particular distance of separation between the first and second sensor members. As another example, such a sensor may include a first sensor member located on the circle 124 and a second sensor member located on the moldboard 126 such that movement of the moldboard 126 causes a particular distance of separation between the first and second sensor members. Such a sensor may determine a distance of separation between the first and second sensor members (e.g., based on a magnetic field strength), to thereby collect data relating to a distance of the movement. Additionally, the one or more sensors may include one or more accelerometers.

Figure 3:
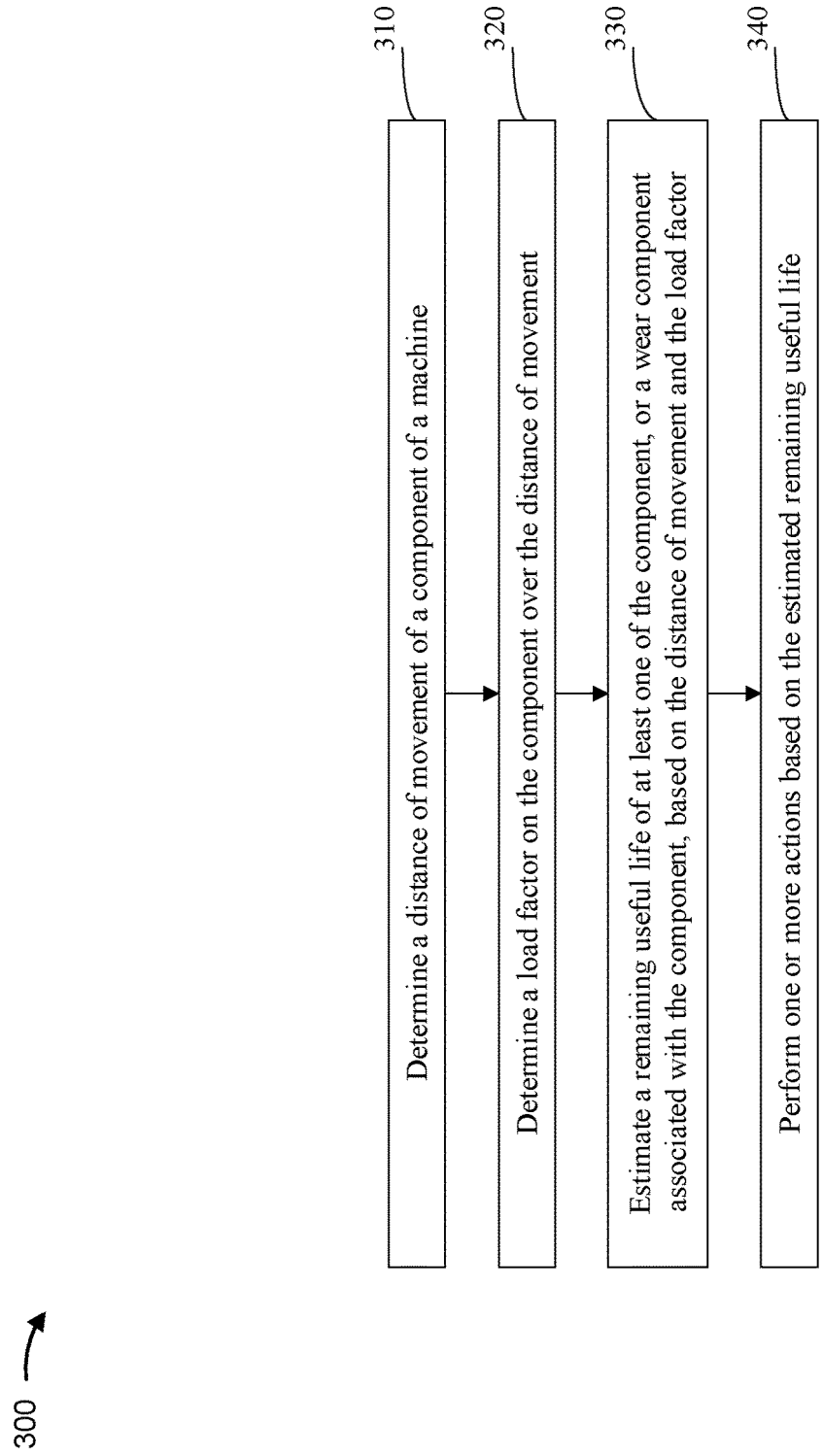
FIG. 3 is a flow chart of an example process for remaining useful life prediction.

FIG. 3 is a flow chart of an example process 300 for remaining useful life prediction. One or more process blocks of FIG. 3 may be performed by the controller 112 (e.g., using a remaining useful life prediction system implemented by the controller 112) of machine 100. Additionally, or alternatively, one or more process blocks of FIG. 3 may be performed by another device or a group of devices separate from or including the controller 112, such as a user device, a server device, and/or another device or component that is internal or external to the machine 100.

As shown in FIG. 3, process 300 may include determining a distance of movement of a component of a machine (block 310). For example, the controller 112 (e.g., using one or more processors, one or more memories, and/or the like) may determine a distance of movement of a component of a machine. The component may be a circle 124 of the DCM assembly 110, in which case the distance of movement may relate to a rotational movement of the circle 124. Additionally, or alternatively, the component may be the moldboard 126 of the DCM assembly 110, in which case, the distance of movement may relate to a sideshift movement of the moldboard 126.

The distance of movement may be determined based on one or more measurements obtained by one or more sensors. For example, the controller 112 may obtain measurements collected by the one or more sensors 138 and/or the one or more sensors 140, and may determine the distance of movement based on the measurements. In some cases, such as when the component is the circle 124, the one or more sensors 138 may collect measurements of an angular distance of movement, and the controller 112 may determine the distance of movement (e.g., a linear distance of movement) based on the angular distance of movement and information relating to a radius of the circle 124. In some cases, the one or more sensors 140 may be associated with a piston-sensing cylinder that provides actuation of the circle 124 or the moldboard 126. For example, the movement of the component (e.g., the moldboard 126) may be a sideshift movement actuated by a position-sensing cylinder (e.g., the position-sensing cylinder 142), and the distance of movement may be determined based on a measurement obtained from the position-sensing cylinder.

In some implementations, the distance of movement is not determined based on measurements from the one or more sensors 138 and/or the one or more sensors 140. For example, the controller 112 may determine an estimate of the distance of movement based on a degree of manipulation of the operator control 130 for movement of the DCM assembly 110. The operator control 130 may enable an operator of the machine 100 to move the circle 124 (e.g., rotate the circle 124) and/or move the moldboard 126 (e.g., sideshift the moldboard 126) according to a duration and/or an intensity at which the operator manipulates the operator control 130. Accordingly, the controller 112 may monitor a degree (e.g., a degree of duration and/or intensity) of such manipulation in order to estimate the distance of movement (e.g., based on data correlating degree of manipulation to distance of movement). Additionally, or alternatively, the controller 112 many monitor a flow rate of hydraulic fluid directed an actuator of the circle 124 or the moldboard 126 in order to estimate the distance of movement (e.g., based on data correlating flow rate to distance of movement).

As further shown in FIG. 3, process 300 may include determining a load factor on the component over the distance of movement (block 320). For example, the controller 112 (e.g., using one or more processors, one or more memories, and/or the like) may determine a load factor on the component over the distance of movement. The load factor may be determined based on one or more measurements obtained by one or more sensors. For example, the controller 112 may obtain measurements collected by one or more sensors associated with the power source 108, the wheels 114, and/or the wheels 116, and may determine the load factor based on the measurements. The controller 112 may determine the load factor based on a load of the power source 108 that powers the DCM assembly 110 (e.g., a load detected by one or more sensors associated with the power source 108) and a speed of the machine 100 (e.g., a speed detected by one or more sensors associated with the wheels 114 and/or the wheels 116).

In some implementations, process 300 may further include determining whether the moldboard 126 of the DCM assembly 110 is in ground (i.e., penetrating a ground surface) prior to determining the load factor. When the moldboard 126 is not in ground (i.e., raised above a ground surface), the controller 112 may determine that there is no load on the DCM assembly 110. When the moldboard 126 is in ground, the controller 112 may determine the load factor on the DCM assembly 110, as described above. The controller 112 may determine whether the moldboard 126 is in ground based on data collected by one or more sensors associated with the drawbar 120. For example, the data may indicate an amount of vertical pivot of the drawbar 120, and the controller 112 may determine whether the moldboard 126 is in ground based on the amount of vertical pivot.

As further shown in FIG. 3, process 300 may include estimating a remaining useful life of at least one of the component, or a wear component associated with the component, based on the distance of movement and the load factor (block 330). For example, the controller 112 (e.g., using one or more processors, one or more memories, and/or the like) may estimate a remaining useful life of the component, or a wear component associated with the component, based on the distance of movement and the load factor. The remaining useful life may be based on a cumulative distance of movement and a cumulative load over the cumulative distance of movement since a previous replacement of the component and/or the wear component. Accordingly, the controller 112 may monitor, or obtain data relating to, replacement of the component and/or the wear component and re-initialize an associated remaining useful life estimate when replacement is detected or indicated.

The controller 112 may estimate the remaining useful life using data that correlates load over a particular distance with a degree of wear of the component and/or the wear component. Such data may be specific to a particular machine. For example, based on historical data of the particular machine relating to distance of movement, load, and a rate of replacement of the component and/or the wear component, data specific to the particular machine may be generated and used by the controller 112 to estimate the remaining useful life.

In some cases, the controller 112 may estimate a remaining useful life of the one or more wear components 136 of the DCM assembly 110 (e.g., one or more wear components 136 associated with the circle 124 and/or one or more wear components associated with the moldboard 126). In such a case, the controller 112 may estimate a remaining useful life of a wear component 136 associated with the circle 124 when the determined distance of movement relates to movement of the circle 124, and may estimate a remaining useful life of a wear component 136 associated with the moldboard 126 when the determined distance of movement relates to movement of the moldboard 126.

As further shown in FIG. 3, process 300 may include performing one or more actions based on the estimated remaining useful life (block 340). For example, the controller 112 (e.g., using one or more processors, one or more memories, a communication interface, and/or the like) may perform one or more actions based on the estimated remaining useful life. An action may be providing information relating to the estimated remaining useful life to a display of the machine 100. The information may indicate a percentage of useful life remaining, a remaining distance of movement of the component until a replacement is needed, a remaining machine operation time until a replacement is needed, and/or the like. An action may relate to transmitting information relating to the estimated remaining useful life to a user device (e.g., a user device associated with an operator, an owner, a servicer, and/or the like of the machine 100).

An action may relate to transmitting an alert to a user device if the estimated remaining useful life satisfies a threshold value. For example, if the estimated remaining useful life is below a threshold value, the controller 112 may transmit, or cause another device to transmit, an alert suggesting a replacement of the component and/or the wear component. An action may relate to transmitting a request for a replacement component and/or a replacement wear component if the estimated remaining useful life satisfies a threshold value. For example, if the estimated remaining useful life is below a threshold value, the controller 112 may transmit, or cause another device to transmit, (e.g., to a servicer, a supplier, and/or the like) a request for a replacement. An action may relate to scheduling servicing for the DCM assembly 110 and/or machine 100 if the estimated remaining useful life satisfies a threshold value. For example, if the estimated remaining useful life is below a threshold value, the controller 112 may schedule (e.g., with a servicer) servicing for the machine 100.

INDUSTRIAL APPLICABILITY

The disclosed remaining useful life prediction system may be used with any machine having one or more components that, over time, may wear or become spent. In particular, the remaining useful life prediction system may be used to predict a remaining useful life of such one or more components. Moreover, the remaining useful life prediction system may be used to predict a remaining useful life of components that are difficult to access or inspect for signs of wear. In this way, the remaining useful life prediction system may provide an early indication when replacement of a component is needed, thereby improving machine functionality and useful life. For example, frequent replacement of a wear component used in a DCM of a motor grader may be needed in order to maintain grade accuracy and/or prevent wear or damage to the DCM.

What is claimed is:

1. A system, comprising:
a drawbar-circle-moldboard (DCM) assembly;
a wear component provided on an external portion of a circle of the DCM assembly,
the wear component, provided on the external portion of the circle of the DCM assembly, including a sacrificial material or a material that is softer than the circle, and
the wear component, provided on the external portion of the circle of the DCM assembly, configured to protect the circle from wear during movement of the circle of the DCM assembly; and
a controller configured to:
identify one or more measurements of an angular distance of movement of the circle of the DCM assembly,
determine a linear distance of movement of the circle of the DCM assembly based on the angular distance of movement,
determine a load factor on the DCM assembly over the linear distance of movement,
estimate a remaining useful life of the wear component, provided on the external portion of the circle of the DCM assembly, based on the linear distance of movement and the load factor, and
perform one or more actions based on the estimated remaining useful life.

2. The system of claim 1, wherein the controller, when performing the one or more actions, is configured to at least one of:
provide information relating to the estimated remaining useful life to a display,
transmit information relating to the estimated remaining useful life to a user device,
transmit an alert to a user device if the estimated remaining useful life satisfies a threshold value,
transmit a request for a replacement wear component if the estimated remaining useful life satisfies a threshold value, or
schedule servicing for the DCM assembly if the estimated remaining useful life satisfies a threshold value.

3. The system of claim 1, wherein the controller, when determining the load factor, is configured to:
determine the load factor based on one or more measurements obtained by one or more sensors.

4. The system of claim 1, wherein the load factor is determined based on a load of a power source that powers the DCM assembly and a speed of a machine that includes the DCM assembly.

5. The system of claim 1, wherein the controller is further configured to:
determine whether a moldboard of the DCM assembly is in ground prior to determining the load factor.

6. A motor grader, comprising:
a drawbar-circle-moldboard (DCM) assembly;
a wear component provided on an external portion of a circle of the DCM assembly,
the wear component, provided on the external portion of the circle of the DCM assembly, including a sacrificial material or a material that is softer than the circle, and
the wear component, provided on the external portion of the circle of the DCM assembly, configured to protect the circle from wear during movement of the circle;
one or more sensors configured to collect measurements of an angular distance of movement of the circle of the DCM assembly; and
a controller configured to:
determine a linear distance of movement of the circle of the DCM assembly based on the angular distance of movement, and
estimate a remaining useful life of the wear component based on the linear distance of movement and a load factor on the DCM assembly over the linear distance of movement.

7. The motor grader of claim 6, wherein a sensor of the one or more sensors includes a first sensor connected to a drawbar of the DCM assembly and a second sensor connected to the circle of the DCM assembly.

8. The motor grader of claim 6, wherein a sensor of the one or more sensors includes a first sensor connected to the circle of the DCM assembly and a second sensor connected to a moldboard of the DCM assembly.

9. A method, comprising:
identifying, by a device, one or more measurements of an angular distance of movement of a circle of a drawbar-circle-moldboard (DCM) assembly of a machine;
determining, by the device, a linear distance of movement of the circle of the DCM assembly based on the angular distance of movement;
determining, by the device, a load factor on the circle of the DCM assembly;
estimating, by the device and based on the linear distance of movement and the load factor, a remaining useful life of a wear component that is provided on an external portion of the circle of the DCM assembly and is configured to protect the circle from wear during movement of the circle of the DCM assembly; and
performing, by the device, one or more actions based on the estimated remaining useful life.

10. The method of claim 9, wherein the one or more actions include at least one of:
providing information relating to the estimated remaining useful life to a display of the machine, transmitting information relating to the estimated remaining useful life to a user device,
transmitting an alert to a user device if the estimated remaining useful life satisfies a threshold value,
transmitting a request for a replacement component if the estimated remaining useful life satisfies a threshold value,
transmitting a request for a replacement wear component if the estimated remaining useful life satisfies a threshold value, or
scheduling servicing for the machine if the estimated remaining useful life satisfies a threshold value.

11. The method of claim 9, wherein the machine is a motor grader.

12. The method of claim 9, wherein the load factor is determined based on a load of a power source that powers the DCM assembly and a speed of the machine.

13. The method of claim 9, wherein the linear distance of movement is determined further based on information relating to a radius of the circle of the DCM assembly.

14. The system of claim 1, wherein the linear distance of movement is determined further based on information relating to a radius of the circle of the DCM assembly.

15. The motor grader of claim 6, wherein the linear distance of movement is determined further based on information relating to a radius of the circle of the DCM assembly.

16. The system of claim 1, wherein the controller, when performing the one or more actions, is configured to:
transmit a request for a replacement wear component based on the estimated remaining useful life satisfying a threshold value.

17. The system of claim 1,
wherein the circle comprises steel, and
wherein the wear component, provided on the external portion of the circle of the DCM assembly, comprises plastic, and
wherein the plastic is the material that is softer than the circle.

18. The system of claim 1, further comprising:
a different wear component that is provided on the external portion the circle of the DCM assembly.

19. The method of claim 9, wherein the one or more actions include:
transmuting a request for a replacement wear component based on the estimated remaining useful life satisfying a threshold value.

20. The method of claim 9,
wherein the circle comprises steel,
wherein the wear component, provided on the external portion of the circle of the DCM assembly, comprises plastic, and
wherein the plastic is the material that is softer than the circle.

* * * * *